Sept. 22, 1931.  J. G. SWAIN  1,824,752
DUAL WIRE WHEEL
Filed May 31, 1928   2 Sheets-Sheet 1
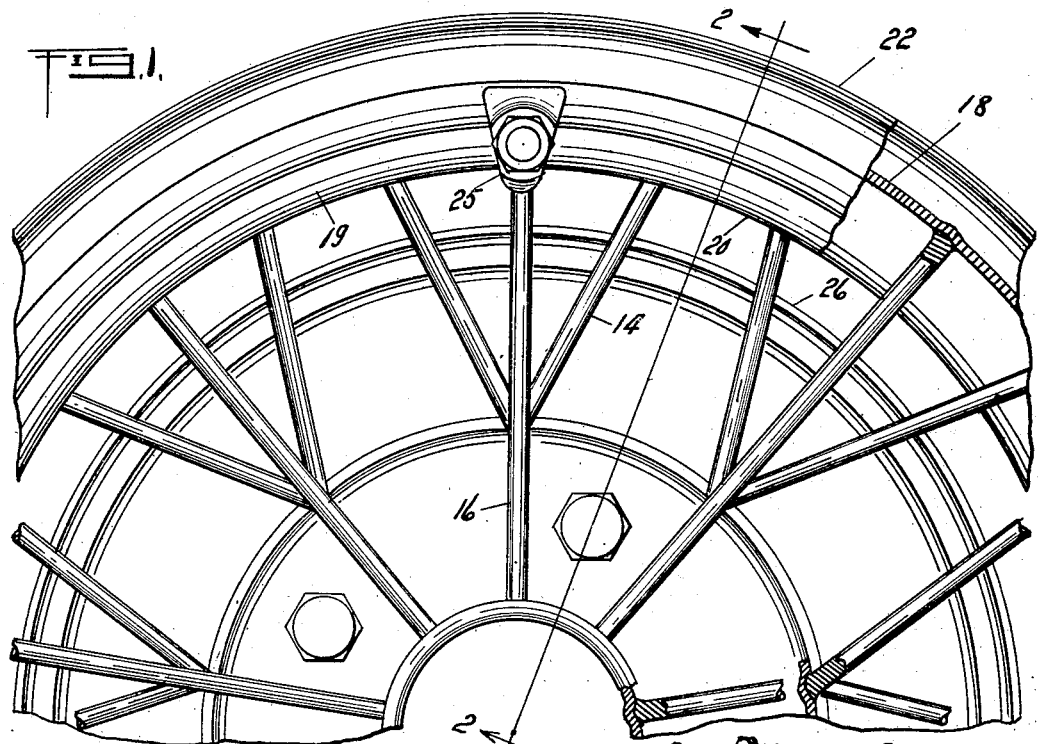
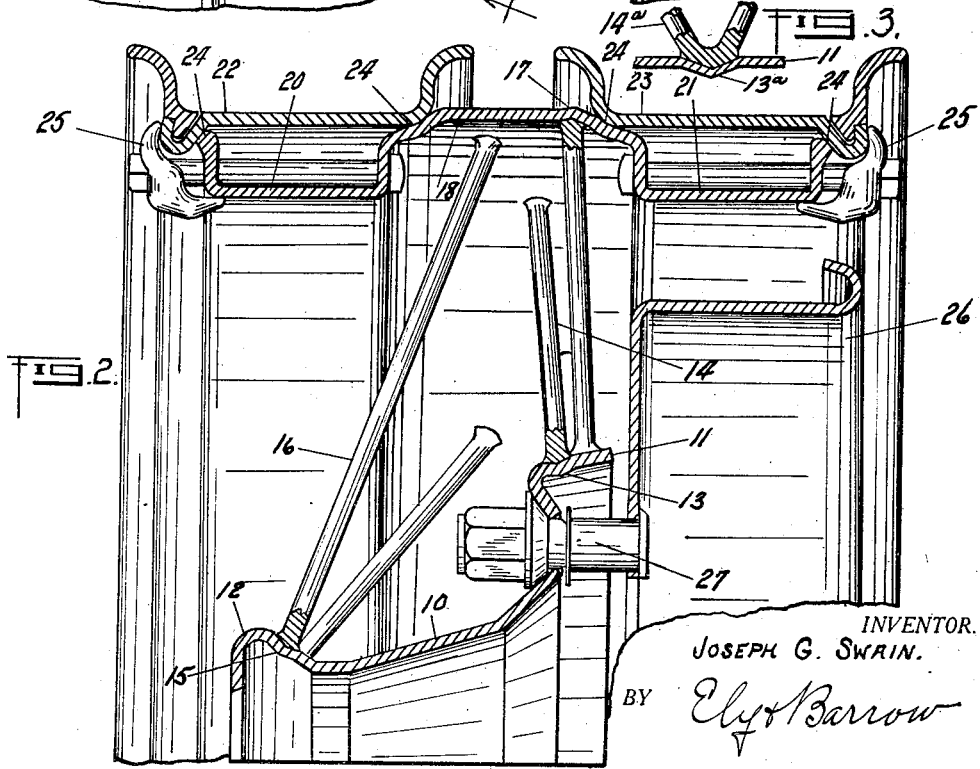
INVENTOR.
JOSEPH G. SWAIN.
BY *Ely f Barrow*
ATTORNEYS.

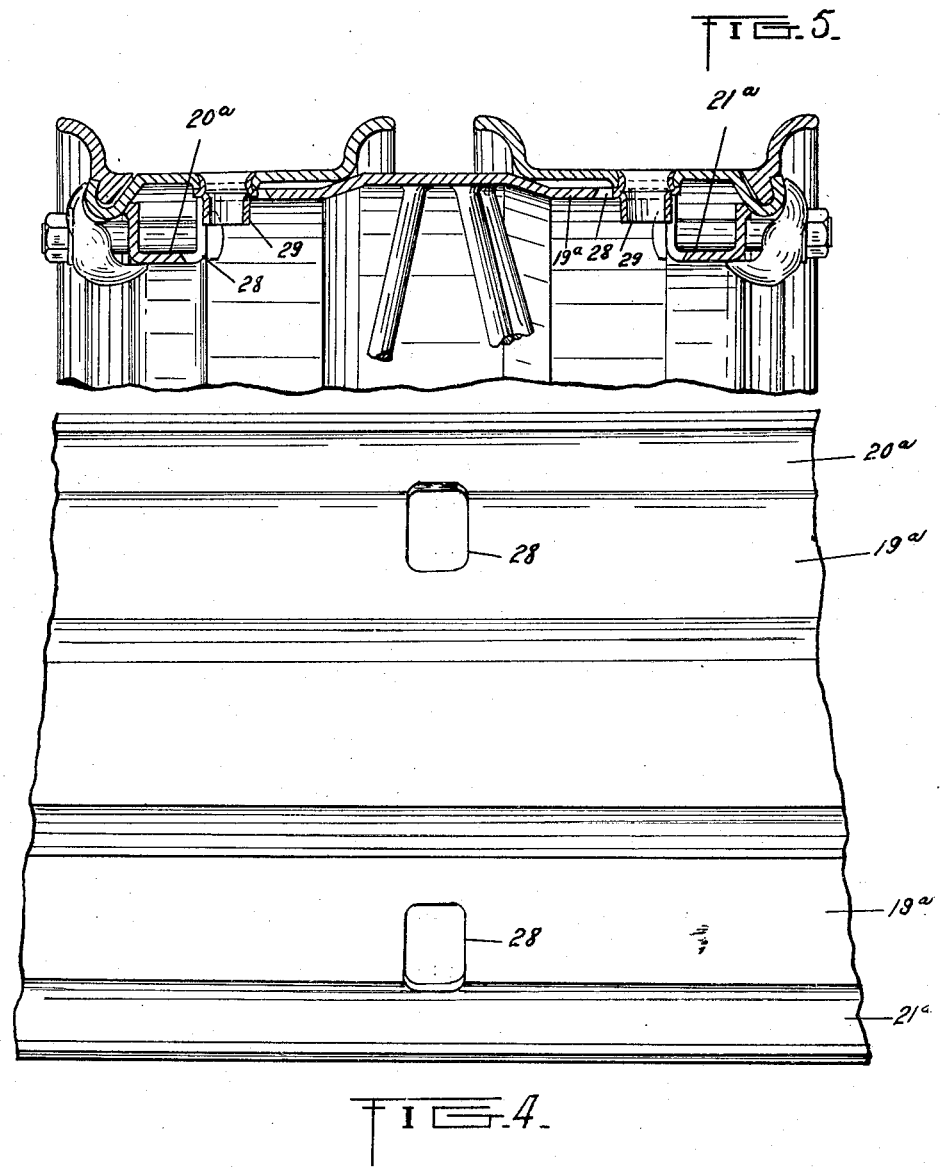

Patented Sept. 22, 1931

1,824,752

UNITED STATES PATENT OFFICE

JOSEPH G. SWAIN, OF AKRON, OHIO, ASSIGNOR TO THE FIRESTONE STEEL PRODUCTS COMPANY, OF AKRON, OHIO, A CORPORATION OF OHIO

DUAL WIRE WHEEL

Application filed May 31, 1928. Serial No. 281,776.

This invention relates to dual wire wheels, the spokes of which are maintained under radial compression.

An object of the invention is to devise a dual wheel construction in which the wire or rod-like spokes are welded respectively to a metal hub and a metal felloe. A further object is to devise a dual wheel construction comprising a one-piece continuous dual felloe. Another object of the invention is to devise a continuous dual metal felloe formed with three channels, two directed outwardly for supporting a pair of tire rims, and one directed inwardly to form the seat for the spokes.

The foregoing and other objects are obtained by the construction illustrated in the accompanying drawings and described below. It is to be understood that the invention is not limited to the specific form thereof disclosed herein.

Of the accompanying drawings,

Figure 1 is a fragmentary elevation of a wheel embodying the principles of the invention;

Figure 2 is a transverse section thereof taken on the line 2—2 of Figure 1;

Figure 3 is a detailed section of a modified form of spoke connection;

Figure 4 is a plan view of a modified form of felloe construction; and

Figure 5 is a transverse section of the felloe illustrated in Figure 4, and having tire rims mounted thereon.

Referring to the drawings, 10 represents a hub preferably stamped or pressed from sheet metal and formed with inside and outside lateral flanges 11 and 12. Spaced indentations 13 are pressed in the inside flange to receive the radially inner ends of inside spokes 14, while indentations 15 pressed in the outside flange of the hub serve to seat the radially inner ends of outside spokes 16. The radially outer ends of all of the spokes are seated in spaced indentations 17 pressed in the inwardly directed channel 18 of the continuous felloe 19, all of the spoke ends being headed to provide a contour conforming to the indentations in the felloe and hub. The felloe and hub are preferably formed of rolled sheet metal, thus affording a light but durable and non-distortable construction.

In place of the separate rod spokes 14 for the inside of the hub there may be provided a V-shaped inside spoke 14$^a$ having its vertex seated in an indentation 13$^a$ in the inside flange 11 of the hub, as shown in the modification illustrated in Figure 3. The felloe, spokes and hub may be assembled in any desired manner such as by mechanically contracting the felloe about the spokes. Then the whole wheel assembly may be united into an integral unitary structure by electrically welding the spoke ends in their seats. The particular process of assembly forms no part of the present invention.

In addition to the central inwardly directed channel 18 of the continuous felloe 19, the latter is formed with outside and inside outwardly facing channels 20 and 21 respectively for supporting outside and inside demountable tire rims 22 and 23. Annular tapered seats 24 are formed on the felloe whereby the rims may be wedged into secure seating relationship therewith by means of clamping lugs or plates 25. If desired a brake drum 26 may be mounted on the hub by means of studs 27 attached to the inside flange 11 thereof.

Instead of extending the felloe channels 20 and 21 to a point adjacent the rim seats 24, the felloe may be formed as at 19$^a$ in Figures 4 and 5 to provide narrow channels 20$^a$ and 21$^a$, the inner walls of the channels being provided with apertures 28 to accommodate the valve stem ferrules 29 of the tire rims for preventing relative rotation between the tire rim and the felloe.

It will be seen that a simple, light, and durable wire spoke dual wheel construction is thus provided. Further modifications of the structure herein disclosed may be resorted to without departing from the spirit of the invention or the scope thereof as defined by the appended claims.

What is claimed is:

1. In a wheel construction, a continuous felloe formed with a central inwardly directed spoke seating channel and an outwardly directed demountable rim seating channel on each side of said central channel.

2. In a wheel construction, a continuous rolled sheet metal felloe having an outside seat for a demountable rim, a central inwardly facing channel providing a seat for a series of spokes, and an inside seat for a second demountable rim.

3. In a wheel construction, a continuous felloe, having an outside seat for a demountable rim, a central inwardly facing channel and an inside seat for a second demountable rim.

4. In a wheel construction, a continuous felloe formed with a central inwardly directed spoke seating channel, an outwardly directed demountable rim seating channel on each side of said central channel, and a demountable tire rim mounted about each rim seating channel.

JOSEPH G. SWAIN.